Nov. 4, 1969  K. G. McMILLEN  3,476,148
VALVE DETENT MECHANISM
Filed June 5, 1967
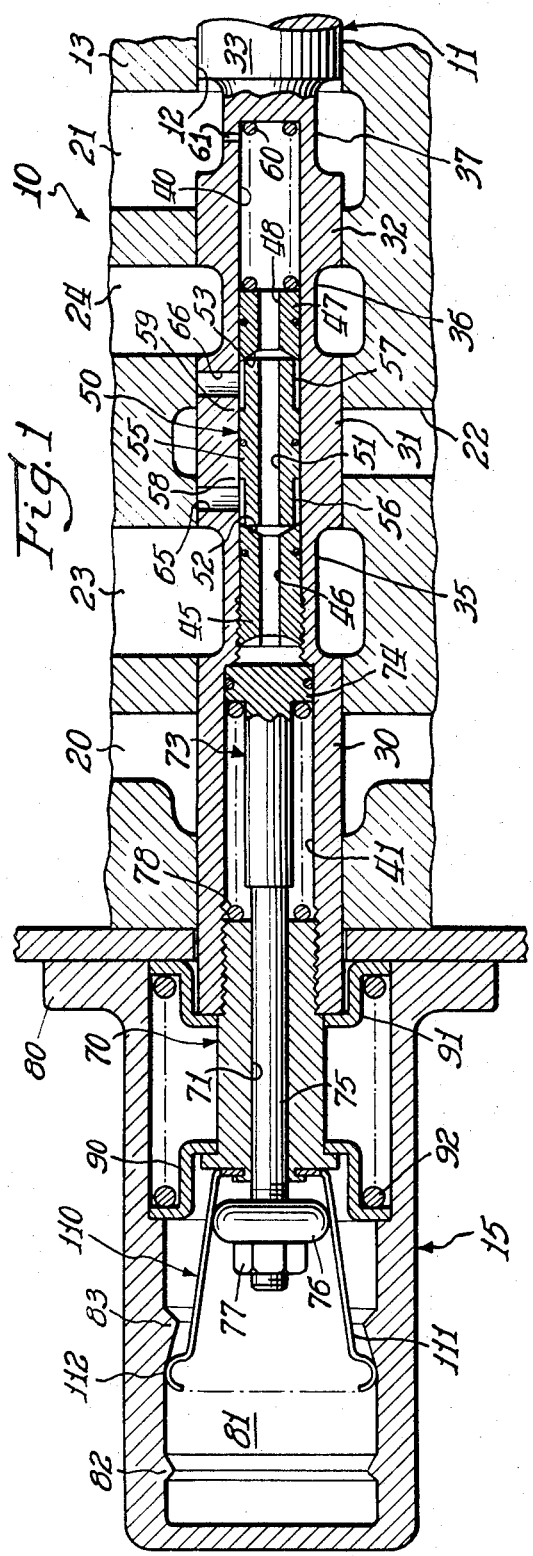
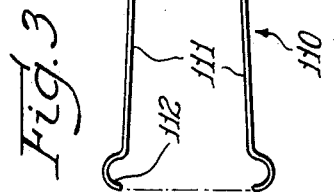
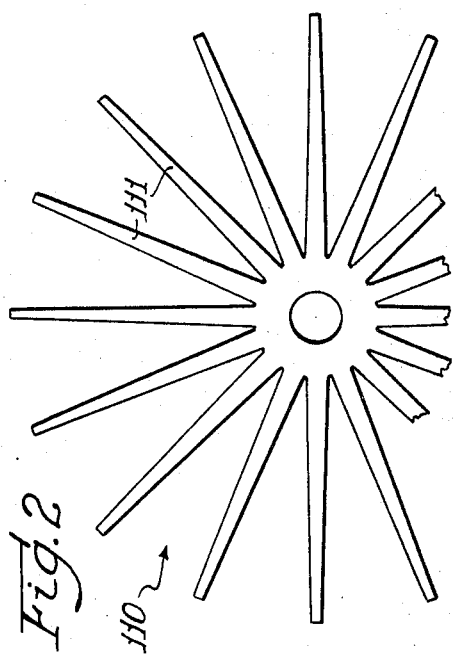
Inventor:
Kenneth G. McMillen
By: Robert L. Zieg  Atty.

United States Patent Office 3,476,148
Patented Nov. 4, 1969

3,476,148
VALVE DETENT MECHANISM
Kenneth G. McMillen, Wolcottville, Ind., assignor to Borg-Warner Corporation, Chicago, Ill., a corporation of Illinois
Filed June 5, 1967, Ser. No. 643,544
Int. Cl. F16k 15/18, 31/143
U.S. Cl. 137—624.27                              11 Claims

ABSTRACT OF THE DISCLOSURE

A valve mechanism including a spool having a detent means thereon with means creating a predetermined detent force and a relief valve within the manual valve movable upon an increase of pressure beyond a predetermined maximum to admit pressure to a piston to actuate said detent mechanism to release the force and allow centering springs to move the manual valve to its neutral position.

SUMMARY OF THE INVENTION

An improved manual valve movable to a plurality of positions including a neutral position, detent means holding said valve in a selected position with a predetermined force, biasing means tending to move said valve to its neutral position, means in said valve operative in response to a pressure increase beyond a predetermined maximum to release said detent mechanism whereby said biasing means will return said manual valve to its neutral position when said predetermined pressure is exceeded.

DESCRIPTION OF THE DRAWING

FIGURE 1 is a cross sectional view through a valve embodying the principles of the invention.

FIGURE 2 is a view of the detent spring before completed, and

FIGURE 3 is a view of the detent spring completed.

Referring to FIGURE 1 there is disclosed a valve mechanism 10 including a valve spool 11 slidable in a bore 12 provided in a valve body 13. Associated with the valve mechanism 10 is a detent mechanism 15. The valve body 13 includes fluid pressure return ports 20 and 21, a pressure inlet port 22 and fluid pressure outlet ports 23 and 24.

The spool 11 includes lands 30, 31, 32 and 33. A groove 35 separates lands 30 and 31, a groove 36 separates lands 31 and 32, and a groove 37 separates lands 32 and 33. The right end of spool 11 is adapted to be connected to a standard manual lever mechanism (not illustrated) for sliding the spool 11 in the bore 12.

Provided within the spool 11 is a central bore 40 opening into an enlarged bore 41 on the left end thereof as viewed in FIGURE 1.

Bore 40 is closed by a plug 45 having a central bore 46 therethrough. Also provided within the bore is a movable plug 47 having a central bore 48 therethrough. Between the plugs 45 and 47 is a relief valve piston 50. Relief valve piston 50 has a central passage 51 therethrough.

Plug 45 has a conical valve seat 52 provided therein and plug 47 has a conical valve seat 53 therein. Relief valve piston 50 includes an enlarged diameter central portion 55 and reduced diameter end portions 56 and 57, which in cooperation with plugs 45 and 47 forms a differential area 58 on the plug 45 and a differential area 59 on the plug 47. Reduced portion 56 is engageable with valve seat 52 to provide a fluid tight seal and reduced portion 57 is engageable with valve seat 53 to provide a fluid tight seal. A spring 60 is provided within the bore 40 which engages plug 47 urging same into engagement with piston 50.

A radially extending bore 61 is provided between bore 40 and groove 37 of spool 11 thereby placing bore 40 on the right side of plug 47 in communciation with a return port 21. A radially extending fluid port 65 is provided in spool 11 which connects the outer diameter of land 31 to bore 40 in the area of reduced portion 56. Valve spool 11 also includes a radially extending port 66 which connects the outer diameter of land 31 with the bore 40 in the area of reduced portion 57. The bore 41 is closed by an end plug 70 which may be secured within the bore 41, as for example, by threads. The plug 70 has a central bore 71 extending therethrough. Mounted within the bore 41 is an actuating member 73 including a piston 74 provided on the right end thereof connected to a piston rod 75. Mounted on the piston rod 75 and secured thereto is a cam 76 which may be secured to the rod as, for example, by a nut 77 screw-threaded on the rod. The piston 74 is slidable within bore 41. A spring 78 engages the plug 70 and the piston 74 urging the piston 74 to the right thus urging cam 76 to the right.

The detent mechanism 15 of the present invention includes a cover member 80 having a detent chamber 81 therein. On the inner diameter of detent chamber 81 projections 82 and 83 are provided which determine detent positions for the valve spool 11. A retainer 90 is provided on valve spool 11 which encircles the end plug 70. A retainer 91 is also provided encircling end plug 70 and engaging the end of the valve spool 11.

Fixed on the left end of the valve spool 11 is a cup-shaped detent spring comprising a flexible means 110 which has a plurality of flexible fingers 111 thereon, each provided with a curved portion 112 thereon which is adapted to engage the inner diameter of detent chamber 81. The cup-shaped spring 110 is secured to the left end of the valve spool 11 and more particularly to the end of the plug 70 and may be secured in any known manner.

Referring to FIGURES 2 and 3, a more detailed disclosure of the cup-shaped spring 110 is provided. FIGURE 2 shows the spring, which is constructed of sheet metal, in "blank" form prior to being bent to its final shape. FIGURE 3 shows the spring in its final shape as to be installed in the valve mechanism. The spring may be manufactured to provide different detent forces due to differing inherent resiliencies depending upon the type of sheet metal used and the heat treatment given same. Further, the form of the bends made in the spring may be varied to vary its detent force.

The interior of detent chamber 81 is illustrated with two projections 82 and 83 formed therein. Thus providing a detent position to the left of projection 82 and a second detent position to the right of projection 83 and a neutral position between the projections 82 and 83 as pictured in FIGURE 1. The detent mechanism may be provided with additional detent positions as desired by varying the contour of the interior of the detent chamber 81.

The operation of the valve mechanism of the present invention is as follows: the centering spring 92 in its cooperation with retainers 90 and 91, the retainer 90 engaging end plug 70 and the retainer 91 engaging valve spool 11, is such as to urge the valve spool to its neutral position with the curved portions 112 of spring 110 in the position illustrated in FIGURE 1. The particular valve spool 11 with which the present invention has been illustrated includes two alternately selectable pressure outlet ports 23 and 24 which may be connected by the valve to the pressure inlet port 22.

If, for example, valve spool 11 is moved to the left, a position can be established in which pressure port 22 is connected through groove 36 to outlet port 24. When this position of the valve spool is established, portions 112 on the spring 110 move past and to the left of the projection 82 in the interior of detent chamber 81 and projection 82 holds the manual valve in this position. Spring 78 within the bore 41 urging the actuating member 73 to the right establishes a predeterminel force of the detent spring 110 engaging the interior surface of detent chamber 81 since the cam 76 is urged into engagement with the spring fingers 111 and urges them radially outwardly.

With the manual valve in the position described, transmitting fluid pressure from inlet port 22 to outlet port 24, a radial port 66 will be connected to the pressure being conducted between inlet port 22 and outlet port 24. This pressure will be communicated to the bore 40 in the area of end portion 57 and will act on the differential area 59 created on plug 47 by the relief valve piston 50. If the pressure being supplied exceeds a predetermined value which would be established by the size of the spring 60 urging plug 47 to the left and the size of the differential area 59, the plug 47 will be moved to the right unseating end portion 57 from valve seat 52 thus allowing fluid pressure from the inlet pressure port to flow through the central passage 51 of piston 50, central bore 46 of plug 45 and bore 41 to act on the right end of piston 74. Bore or orifice 61 is connected to return port 21, thereby internal bores 46 and 48 and central passage 51 are at low pressure prior to movement of plug 47. When pressure is admitted into bores 46, 48 and central passage 51 a pressure build up will occur acting on piston 74 due to a pressure drop created across orifice 61. Piston 74 will then move to the left thereby moving cam 76 to the left to greatly reduce the force with which the spring fingers 111 engage the interior surface of the detent chamber. This reduction in force is sufficient to allow the centering spring 92 to automatically return the valve spool 11 to the neutral position.

Thus on occurrence of a predetermined maximum pressure the detent mechanism 15 is automatically released and the manual valve returned to its neutral position.

If the manual valve is moved to the right from its neutral position fluid pressure is transmitted from the pressure inlet port 22 to pressure outlet port 23 through the groove 35. In this situation, pressure is conducted through port 65 to the interior of bore 40 in the area of end portion 56. If the pressure exceeds a predetermined value, due to its acting on diffetrential area 58, piston 50 will move to the right moving plug 47 against spring 60 and thus unseating end portion 56 from valve seat 52. Fluid pressure will then be admitted into bore 46 in plug 45 and due to the pressure drop across orifice 61 will again act on piston 74 to release the detent mechanism. The detent mechanism will again be released in the manner described above.

From the above it will be apparent that the present device provides a valve mechanism with an automatic return to neutral function upon the occurrence of an excess fluid pressure. This detvice will be of great value as a safety feature in manual valve mechanisms for controlling certain implements on tractors, loaders and other heavy equipment wherein the operation would perhaps not react quickly enough to prevent damage to equipment upon occurrence of a sudden excess pressure condition. Conveniently there has been provided a relief valve constructed within the manual valve in a relatively simple manner which is so arranged that it can respond to fluid pressure in any selected pressure outlet port to send fluid pressure to the actuating mechanism for releasing the valve detent upon the exceeding of the pressure setting of the relief valve.

The valve mechanism 10 can be constructed with a response value which will be determined as described above by the force of spring 60 and the size of the differential area on the relief valve piston 50. Further, by varying the size of the spring 78 and the form of the cup-shaped detent spring 110, various detent forces can be developed to match the pressure levels with which the valve mechanism 10 would be working. The present device thus provides in a relatively simple and a novel manner an automatic return to neutral function within a manual valve mechanism.

What is claimed is:

1. A valve mechanism comprising a pressure inlet port and a plurality of outlet ports,
   a slidable valve spool having a plurality of positions and operative to connect said pressure inlet port to selected outlet port and said valve spool having a neutral position;
   bias means yieldably urging said spool to the neutral position;
   a detent mechanism comprising a flexible means engageable with a fixed contoured surface, said flexible means being attached to said valve spool whereby when said valve spool is moved from its neutral position, said flexible means will yieldably engage the contoured surface to hold the valve in a selected position; and
   fluid pressure responsive means within said spool and operatively associated with said flexible means, said fluid pressure responsive means normally providing a predetermined force urging aid flexible means into engagement with said contoured surface, said fluid pressure responsive means being movable in response to a predetermined maximum fluid pressure in said selected outlet port to reduce the force with which said flexible means engages said contoured surface whereby said yieldable means will return said valve spool to said neutral position when said predetermined maximum pressure is exceeded.

2. A valve mechanism as claimed in claim 1 wherein said flexible means comprises at least one spring finger urged toward said contoured surface by said fluid pressure responsive means.

3. A valve mechanism as claimed in claim 1 wherein said flexible means comprises a cup-shaped spring having a plurality of spring fingers engageable with said contoured surface.

4. A valve mechanism as claimed in claim 3 wherein said fluid pressure responsive means includes a cam engageable with said fingers and normally urging said fingers radially outwardly into engagement with said contoured surface.

5. A valve mechanism as claimed in claim 4 wherein said fluid pressure responsive means includes a piston slidable within said valve spool and connected to said cam, means in said spool connecting said piston to the pressure in said outlet port when the pressure exceeds a predetermined maximum whereby said piston will move said cam to a position reducing the force urging said spring fingers radially outwardly.

6. In a valve mechanism having a pressure inlet port and a plurality of outlet ports, a valve spool movable to a plurality of positions to provide fluid communication between said pressure inlet port and a selected outlet port, and having a neutral position;
   detent means associated with said spool comprising a contoured surface and flexible means on said spool having a predetermined inherent resiliency engaging said surface to hold said valve in a selected position, said flexible means being urged into engagement with said surface by a cam means;
   a fluid pressure piston within said spool connected to said cam means;
   a relief valve within said spool in fluid communication with said piston, means in said spool connecting said relief valve to a selected fluid pressure output port; and
   yieldable means urging said spool toward its neutral position whereby when the pressure in said selected output port exceeds a predetermined maximum said relief valve will connect said pressure to said piston to move said cam thereby reducing the force urging said flexible means into engagement with said contoured surface whereby said yieldable means will return said spool to the neutral position when said predetermined pressure in said output port is exceeded.

7. A valve mechanism as claimed in claim 6 wherein said relief valve includes a piston having a differential pressure area thereon exposed to the fluid pressure in the selected output port.

8. A valve mechanism comprising a pressure inlet port and a plurality of outlet ports,
a slidable valve spool having a plurality of positions and operative to connect said pressure inlet to a selected outlet port and said valve spool having a neutral position;
means urging said spool to the neutral position;
a releasable detent mechanism comprising flexible means connected to said valve spool and adapted to hold the valve in a selected position; and
fluid pressure responsive means within said spool and connected to said flexible means, said fluid pressure responsive means normally rendering operative said detent mechanism, said fluid pressure responsive means being movable in response to a predetermined maximum fluid pressure in said selected outlet port to release said detent mechanism whereby said urging means will return said valve spool to said neutral position when said predetermined maximum pressure is exceeded.

9. A valve mechanism as claimed in claim 8 wherein said flexible means comprises at least one spring finger urged toward said contoured surface by said fluid pressure responsive means.

10. A valve mechanism as claimed in claim 8 wherein said flexible means comprises a cup-shaped spring engageable with said contoured surface.

11. A valve mechanism as claimed in claim 10 wherein said cup-shaped spring includes a plurality of spring fingers and said fluid pressure responsive means includes a cam engageable with said fingers normally urging said fingers radially outwardly into engagement with said contoured surface.

References Cited

UNITED STATES PATENTS

| | | | |
|---|---|---|---|
| 2,605,108 | 7/1952 | Stephens | 251—297 X |
| 2,689,585 | 9/1954 | Presnell | 251—73 X |
| 3,093,158 | 6/1963 | Tennis | 251—297 X |

ARNOLD ROSENTHAL, Primary Examiner

U.S. Cl. X.R.

251—73, 297